US00RE43484E

(19) United States
(12) Reissued Patent
Browne

(10) Patent Number: US RE43,484 E
(45) Date of Reissued Patent: Jun. 26, 2012

(54) ENDCAP AND POLES

(76) Inventor: Kathy Browne, Canton, MI (US)

(21) Appl. No.: 29/299,329

(22) Filed: Dec. 21, 2007

Related U.S. Patent Documents

Reissue of:
(64) Patent No.: Des. 513,118
Issued: Dec. 27, 2005
Appl. No.: 29/208,087
Filed: Jun. 24, 2004

(51) LOC (9) Cl. ..... 03-03
(52) U.S. Cl. ..... D3/5
(58) Field of Classification Search ..... D3/5–6, D3/10–17; 135/98, 15.1, 16, 20.1, 25.1, 135/27; 297/184.16
See application file for complete search history.

(56) References Cited

U.S. PATENT DOCUMENTS

| | | | | |
|---|---|---|---|---|
| D398,443 | S * | 9/1998 | Bolle | D3/5 |
| 6,220,261 | B1 * | 4/2001 | Glatz | 135/20.1 |
| 2002/0083969 | A1 * | 7/2002 | Tung | 135/98 |

* cited by examiner

*Primary Examiner* — Robert A Delehanty
(74) *Attorney, Agent, or Firm* — Harness, Dickey & Pierce, P.L.C.

(57) CLAIM

The ornamental design for [umbrella poles and endcap for patio or beach] *endcap and poles*, as shown and described.

DESCRIPTION

The characteristic features of the design reside in a curved umbrella pole with ornamental endcap and a middle pole section [that is half-filled with packed sand and half-filled with concrete for stabilization].

The FIGURE is a side perspective view of the [entire] umbrella [and base thereof,] *with endcap and poles* shown in an exploded view for clarity of illustration.

The broken [line] *lines* showing [of (the] *the* base, crank shaft, tilt mechanism, and [parasol) is] *umbrella, the hollow interior of the lower portion of the pole and the hole in the lower portion of the pole that is oriented generally perpendicular to the longitudinal axis of the pole are* for illustrative purposes only and [forms] *form* no part of the claimed design.

1 Claim, 1 Drawing Sheet

Matter enclosed in heavy brackets [ ] appears in the original patent but forms no part of this reissue; matter printed in italics indicates the additions made by reissue.

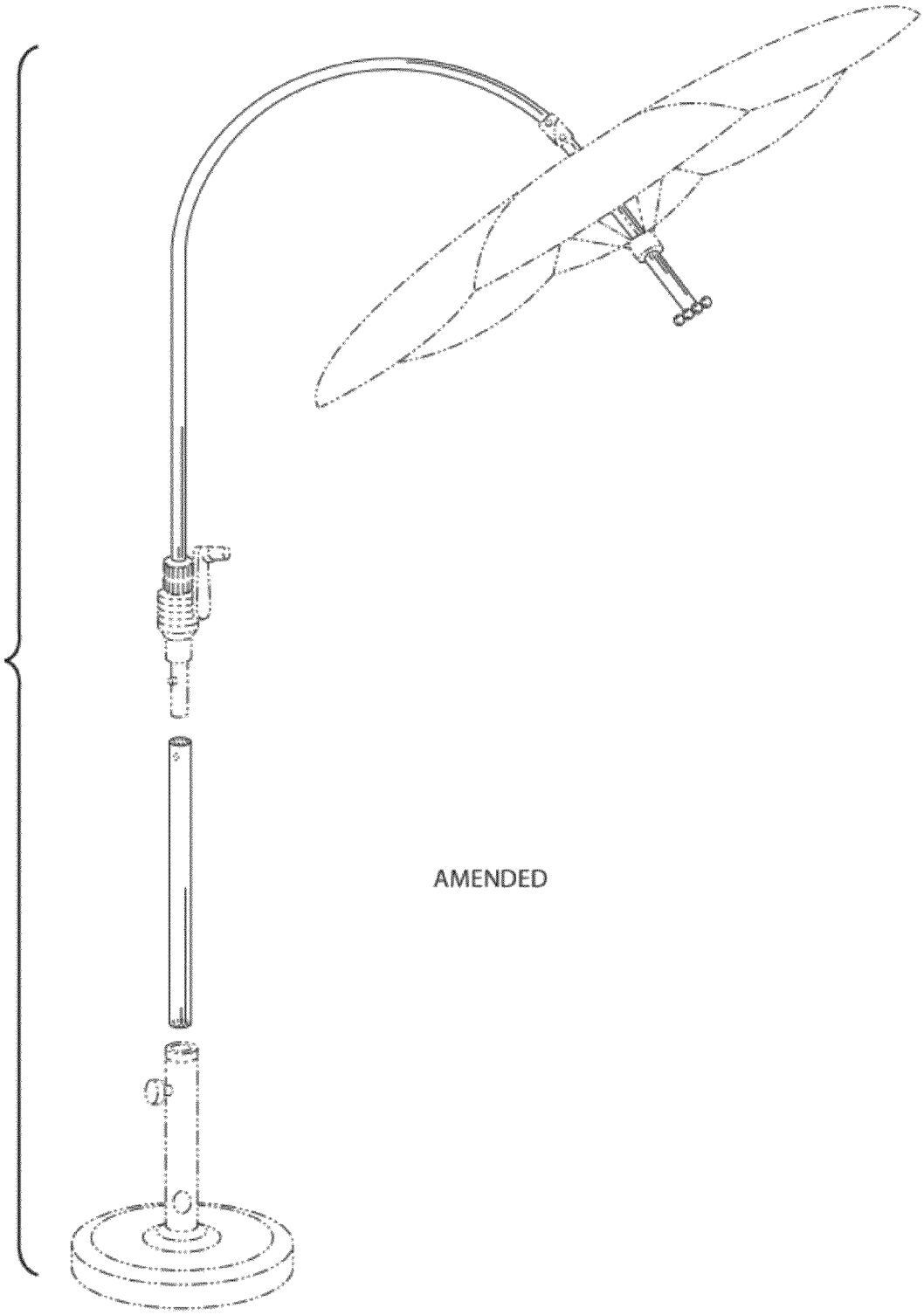
AMENDED